United States Patent [19]
Colucci et al.

[11] Patent Number: 5,634,951
[45] Date of Patent: Jun. 3, 1997

[54] ADDITIVES FOR MINIMIZING INTAKE VALVE DEPOSITS, AND THEIR USE

[75] Inventors: William J. Colucci, Glen Allen; F. Alexander Pettigrew, Chesterfield; Lawrence J. Cunningham, Mechanicsville, all of Va.

[73] Assignee: Ethyl Corporation, Va.

[21] Appl. No.: 660,141

[22] Filed: Jun. 7, 1996

[51] Int. Cl.$^6$ ........................ C10L 1/18
[52] U.S. Cl. .................. 44/415; 560/355; 560/359
[58] Field of Search ................ 44/415; 560/355, 560/359

[56] References Cited

U.S. PATENT DOCUMENTS

| | | | |
|---|---|---|---|
| 3,649,229 | 3/1972 | Otto | 44/73 |
| 3,948,619 | 4/1976 | Worrel | 44/58 |
| 3,994,698 | 11/1976 | Worrel | 44/58 |
| 4,116,644 | 9/1978 | Jackisch et al. | 44/73 |
| 4,231,759 | 11/1980 | Udelhofen et al. | 44/75 |
| 4,398,921 | 8/1983 | Reikin et al. | 44/415 |
| 5,242,469 | 9/1993 | Sakakibara et al. | 44/347 |
| 5,503,644 | 4/1996 | Grapff et al. | 44/415 |

FOREIGN PATENT DOCUMENTS

| | | |
|---|---|---|
| 2089833 | 8/1993 | Canada . |
| 0569228 | 11/1993 | European Pat. Off. . |
| 0647700 | 4/1995 | European Pat. Off. . |
| 2283495 | 5/1995 | United Kingdom . |

*Primary Examiner*—Jacqueline V. Howard
*Attorney, Agent, or Firm*—Dennis H. Rainear

[57] ABSTRACT

New, highly effective detergent/dispersants for use in spark ignition fuels are described. They are Mannich condensation products formed from (i) one mole part of hydroxyaromatic compound having on the ring an aliphatic hydrocarbyl substituent derived from a polyolefin having a number average molecular weight in the range of about 500 to about 3000, (ii) from 0.8 to 1.5 mole part(s) of aliphatic polyamine having one and only one primary or secondary amino group in the molecule capable of participating in the Mannich condensation reaction, and (iii) from 0.8 to 1.3 mole part(s) of aldehyde, provided that the mole ratio of aldehyde to amine is 1.2 or less. Carrier fluids such as poly(oxyalkylene) compounds further enhance the effectiveness of these Mannich condensation products in minimizing or reducing intake valve deposits and/or intake valve sticking.

43 Claims, No Drawings

ADDITIVES FOR MINIMIZING INTAKE VALVE DEPOSITS, AND THEIR USE

TECHNICAL FIELD

This invention relates to novel Mannich base fuel additive compositions that are effective in minimizing intake valve deposits and in reducing valve sticking in internal combustion engines.

BACKGROUND

Despite extensive prior research activities on Mannich base fuel additives carried out over the years, a need exists for Mannich base compositions having superior performance capabilities and superior physical properties. In particular, a most welcome contribution to the art would be the provision of Mannich base compositions that are highly effective in minimizing intake valve deposits in internal combustion engines, that are capable of minimizing valve sticking under standard qualification test conditions, that have much less color than present commercial Mannich fuel detergents, that have minimal odor, that require, and in many cases perform better with, smaller amounts of liquid carrier fluids than are conventionally used, and that provide all of these advantages at attractive competitive costs.

This invention is deemed to constitute such a contribution.

SUMMARY OF THE INVENTION

This invention is based, inter alia, on the discovery that Mannich condensation products having superior performance characteristics and excellent physical properties can be formed by using certain types of polyamines in the condensation reaction and by using the reactants, which include these particular polyamines, in special proportions relative to each other.

Thus, in one of its embodiments this invention provides a Mannich product formed from a mixture of (i) one mole part of at least one hydroxyaromatic compound having on the ring an aliphatic hydrocarbyl substituent derived from a polyolefin having a number average molecular weight in the range of about 500 to about 3000, (ii) from 0.8 to 1.3 mole part(s) of at least one aldehyde, and (iii) from 0.8 to 1.5 mole part(s) of at least one aliphatic polyamine having in the molecule one primary or secondary amino group capable of undergoing a Mannich condensation reaction with (i) and (ii), the other amino group or groups in the molecule being substantially inert toward direct participation in such Mannich condensation reaction, with the proviso that the mole ratio of aldehyde to amine is 1.2 or less. Preferred products of this type are formed by heating a mixture formed from (i), (ii) and (iii), at a temperature above about 40° C. at which a Mannich condensation reaction takes place. Preferred aliphatic polyamines have in the molecule one and only one such reactive primary or secondary amino group and one or more tertiary amino groups.

Another embodiment of this invention is a fuel additive composition which comprises:

a) a Mannich product as described in the immediately preceding paragraph, and b) at least one liquid carrier or induction aid therefor, most preferably at least poly(oxyalkylene) compound having an average molecular weight in the range of about 500 to about 3000.

Still another embodiment is the above-described process by which the above Mannich product of this invention is produced.

Other embodiments include fuels for spark ignition engines into which have been blended small amounts of the various compositions of this invention described herein, and methods for minimizing or reducing intake valve deposits and/or minimizing or reducing intake valve sticking in an internal combustion engine by fueling and/or operating the engine with a fuel composition of this invention.

In additional preferred embodiments of this invention the Mannich product is formed from one mole part of a predominately monoalkylated phenol in which the alkyl substituent is derived from polypropylene, polybutylene or a copolymer of propylene and butylene having a number average molecular weight in the range of about 500 to about 3000 and a polydispersity in the range of about 1 to about 4, from 0.8 to 1.2 mole part(s) of one or more N,N-dialkyl-$\alpha$, $\omega$-alkylenediamines in which the alkylene group has at least 3 carbon atoms, and from 0.8 to 1.2 mole parts of formaldehyde, provided the mole ratio of formaldehyde to the diamine(s) is 1.2 or less. Because of outstanding effectiveness in control (i.e., reduction or minimization) of the weight of deposits formed on intake valves during engine operation, an especially preferred embodiment involves use of N,N-dimethyl-1,3-propanediamine as the polyamine, formaldehyde as the aldehyde, and a molar ratio of the above predominately monoalkylated phenol to N,N-dimethyl-1,3-propanediamine to formaldehyde of 1:1-1.15:0.90-1.20, respectively, with the proviso that if the molar quantity of formaldehyde is larger than the molar quantity of the amine, the excess molar amount of the formaldehyde does not exceed about 0.1. The most preferred molar ratio for these last-named reactants is about 1 mole of the N,N-dimethyl-1,3-propanediamine and about 1.05 mole of formaldehyde per mole of the above predominately monoalkylated phenol. Such Mannich base reaction products have given superlative results in an extensive number of tests.

Other embodiments and features of this invention will become still further apparent from the ensuing description and appended claims.

FURTHER DETAILED DESCRIPTION

Mannich Base Reaction Product

Representative high molecular weight alkyl-substituted hydroxyaromatic compounds used in forming the present Mannich base products are polypropylphenol (formed by alkylating phenol with polypropylene), polybutylphenols (formed by alkylating phenol with polybutenes and/or polyisobutylene), and polybutyl-co-polypropylphenols (formed by alkylating phenol with a copolymer of butylene and/or butylene and propylene). Other similar long-chain alkylphenols may be used, but are less preferred. Examples include phenols alkylated with copolymers of butylene and/or isobutylene and/or propylene, and one or more monoolefinic comonomers copolymerizable therewith (e.g., ethylene, 1-pentene, 1-hexene, 1-octene, 1-decene, etc.) where the copolymer molecule contains at least 50% by weight, of butylene and/or isobutylene and/or propylene units. The comonomers polymerized with propylene or such butenes may be aliphatic and can also contain non-aliphatic groups, e.g., styrene, o-methylstyrene, p-methylstyrene, divinyl benzene and the like. Thus in any case the resulting polymers and copolymers used in forming the substituted phenolic reactant are substantially aliphatic hydrocarbon polymers. Polybutylphenol (formed by alkylating phenol with polybutylene) is preferred. Unless otherwise specified herein, the term "polybutylene" is used in a generic sense to include polymers made from "pure" or "substantially pure"

1-butene or isobutene, and polymers made from mixtures of two or all three of 1-butene, 2-butene and isobutene. Commercial grades of such polymers may also contain insignificant amounts of other olefins. So-called high reactivity polybutylenes having relatively high proportions of polymer molecules having a terminal vinylidene group, formed by methods such as described, for example, in U.S. Pat. No. 4,152,499 and W. German Offenlegungsschrift 29 04 314, are also suitable for use in forming the long chain alkylated phenol reactant.

The alkylation of the hydroxyaromatic compound is typically performed in the presence of an alkylating catalyst such as $BF_3$ at a temperature in the range of about 50 to about 200° C. The long chain alkyl substituents on the benzene ring of the phenolic compound are derived from polyolefin having a number average molecular weight (Mn) of from about 500 to about 3000 (preferably from about 500 to about 2000) as determined by GPC. It is also preferred that the polyolefin used have a polydispersity in the range of about 1 to about 4 (preferably from about 1 to about 2) as determined by GPC.

The Mannich base product may be (and preferably is) made from a long chain alkylphenol. However, other phenolic compounds may be used including high molecular weight alkyl-substituted derivatives of resorcinol, hydroquinone, cresol, catechol, xylenol, hydroxydiphenyl, benzylphenol, phenethylphenol, naphthol, tolylnaphthol, among others. Preferred for the preparation of the Mannich condensation products are the polyalkylphenol reactants, e.g., polypropylphenol and polybutylphenol whose alkyl group has a number average molecular weight of 740–1200, while the most preferred type of alkyl groups is a polybutyl group derived from polybutylene having a number average molecular weight in the range of about 800–950.

The preferred configuration of the alkyl-substituted hydroxyaromatic compound is that of a para-substituted mono-alkylphenol. However, any alkylphenol readily reactive in the Mannich condensation reaction may be employed. Thus, Mannich products made from alkylphenols having only one ring alkyl substituent, or two or more ring alkyl substituents are suitable for use in this invention. The long chain alkyl substituents may contain some residual unsaturation, but in general, are substantially saturated alkyl groups.

A very important feature of this invention is the use of a aliphatic polyamine having one and only one primary or secondary amino group in the molecule capable of entering into the Mannich condensation reaction with the alkylphenolic compound and the aldehyde. The other amino group(s) is/are usually tertiary or quaternary ammonium groups, preferably a single tertiary amino group. However they can be one or more secondary amino groups that are sterically hindered to such an extent as to be substantially incapable of directly participating in the Mannich condensation reaction. The use of the above-specified reactant ratios together with the use of the type of polyamines referred to herein has been shown to result in the provision of novel Mannich base products having excellent performance capabilities and physical properties.

Representative amine reactants are alkylene polyamines having, inter alia, a single suitably reactive primary or secondary amino group in the molecule. Other substituents such as hydroxyl, cyano, amido, etc., can be present in the polyamine. Preferably the amine is an aliphatic diamine having one primary or secondary amino group and one tertiary amino group in the molecule. Examples of suitable polyamines include N,N,N",N"-tetraalkyldialkylenetriamines (two terminal tertiary amino groups and one central secondary amino group), N,N,N',N"-tetraalkyltrialkylenetetramines (one terminal tertiary amino group, two internal tertiary amino group s and one terminal primary amino group), N,N,N',N",N"'-pentaalkyltrialkylenetetramines (one terminal tertiary amino group, two internal tertiary amino groups and one terminal secondary amino group), N,N-dihydroxyalkyl-α,ω-alkylenediamines (one terminal tertiary amino group and one terminal primary amino group), N,N,N'-trihydroxyalkyl-α,ω-alkylenediamines (one terminal tertiary amino group and one terminal secondary amino group), tris(dialkylaminoalkyl)aminoalkylmethanes (three terminal tertiary amino groups and one terminal primary amino group), and like compounds, wherein the alkyl groups are the same or different and typically contain no more than about 12 carbon atoms each, and which preferably contain from 1 to 4 carbon atoms each. Most preferably these alkyl groups are methyl and/or ethyl groups. Preferred polyamine reactants are N,N-dialkyl-α,ω-alkylenediamine, such as those having from 3 to about 6 carbon atoms in the alkylene group and from 1 to about 12 carbon atoms in each of the alkyl groups, which most preferably are the same but which can be different. Most preferred is N,N-dimethyl-1,3-propanediamine.

Examples of polyamines having one reactive primary or secondary amino group that can participate in the Mannich condensation reaction, and at least one sterically hindered amino group that cannot participate directly in the Mannich condensation reaction to any appreciable extent include N-(tert-butyl)-1,3-propanediamine, N-neopentyl-1,3-propanediamine, N-(tert-butyl)-1-methyl-1,2-ethanediamine, N-(tert-butyl)-1-methyl-1,3-propanediamine, and 3,5-di(tert-butyl) aminoethylpiperazine.

Representative aldehydes for use in the preparation of the Mannich base products include the aliphatic aldehydes such as formaldehyde, acetaldehyde, propionaldehyde, butyraldehyde, valeraldehyde, caproaldehyde, heptaldehyde, stearaldehyde. Aromatic aldehydes which may be used include benzaldehyde and salicylaldehyde. Illustrative heterocyclic aldehydes for use herein are furfural and thiophene aldehyde, etc. Also useful are formaldehyde-producing reagents such as paraformaldehyde, or aqueous formaldehyde solutions such as formalin. Most preferred is formaldehyde or formalin.

The condensation reaction among the alkylphenol, the specified amine(s) and the aldehyde is conducted at a temperature in the range of about 40° to about 200° C. The reaction can be conducted in bulk (no diluent or solvent) or in a solvent or diluent. Water is evolved and can be removed by azeotropic distillation during the course of the reaction.

As noted above, another very important feature of this invention is the proportions of the reactants maintained in the Mannich condensation reaction mixture, viz., from 0.8 to 1.5 mole part(s) of at least one aliphatic polyamine of the type described above, and from 0.8 to 1.3 mole part(s) of at least one aldehyde, with the proviso that the mole ratio of aldehyde to amine is 1.2 or less. An especially preferred embodiment involves use of N,N-dimethyl-1,3-propanediamine as the polyamine, formaldehyde as the aldehyde, and a molar ratio of the above predominately monoalkylated phenol to N,N-dimethyl-1,3-propanediamine to formaldehyde of 1:1-1.15:0.90-1.20, respectively, with the proviso that if the molar quantity of formaldehyde is larger than the molar quantity of the amine, the excess molar amount of the formaldehyde does not exceed about 0.1. The most preferred molar ratio for these last-named reactants is about 1 mole of the N,N-dimethyl-1,3-propanediamine and about 1.05 mole of formaldehyde per mole of the above predominately monoalkylated phenol. When performing the reactions on a laboratory scale the foregoing ratios are relatively easy to maintain and control. However, when performing the reaction in large scale plant reactors, the possibility of losses of the more volatile reactants (amine and formaldehyde) can be encountered, as by vaporization into the reactor headspace, entrainment in purge streams as water is being purged from the reaction mixture, etc. Thus when conducting the reaction on a large scale care should be exercised to compensate for any such losses so that the liquid reaction mixture actually contains the reactants in the proportions utilized pursuant to this invention.

Liquid Carriers

The Mannich base products of this invention are preferably used in combination with a liquid carrier or induction aid. Such carriers can be of various types, such as for example liquid poly-α-olefin oligomers, liquid polyalkene hydrocarbons (e.g., polypropene, polybutene, polyisobutene, or the like), liquid hydrotreated polyalkene hydrocarbons (e.g., hydrotreated polypropene, hydrotreated polybutene, hydrotreated polyisobutene, or the like), mineral oils, liquid poly(oxyalkylene) compounds, liquid alcohols or polyols, liquid esters, and similar liquid carriers or solvents. Mixtures of two or more such carriers or solvents can be employed.

Preferred liquid carriers because of their performance capabilities are 1) a mineral oil or a blend of mineral oils that have a viscosity index of less than about 120, 2) one or a blend of poly-α-olefin oligomers, 3) one or more poly(oxyalkylene) compounds having an average molecular weight in the range of about 500 to about 3000, or 4) a mixture of any two or all three of 1), 2) and 3). The mineral oil carriers that can be used include paraffinic, naphthenic and asphaltic oils, and can be derived from various petroleum crude oils and processed in any suitable manner. For example, the mineral oils may be solvent extracted or hydrotreated oils. Reclaimed mineral oils can also be used. Hydrotreated oils are the most preferred. Preferably the mineral oil used has a viscosity at 40° C. of less than about 1600 SUS, and more preferably between about 300 and 1500 SUS at 40° C. Paraffinic mineral oils most preferably have viscosities at 40° C. in the range of about 475 SUS to about 700 SUS. For best results it is highly desirable that the mineral oil have a viscosity index of less than about 100, more preferably, less than about 70 and most preferably in the range of from about 30 to about 60.

The poly-α-olefins (PAO) which are included among the preferred carrier fluids are the hydrotreated and unhydrotreated poly-α-olefin oligomers, i.e., hydrogenated or unhydrogenated products, primarily trimers, tetramers and pentamers of α-olefin monomers, which monomers contain from 6 to 12, generally 8 to 12 and most preferably about 10 carbon atoms. Their synthesis is outlined in *Hydrocarbon Processing*, Feb. 1982, page 75 et seq., and in U.S. Pat. Nos. 3,763,244; 3,780,128; 4,172,855; 4,218,330; and 4,950,822. The usual process essentially comprises catalytic oligomerization of short chain linear alpha olefins (suitably obtained by catalytic treatment of ethylene). The poly-α-olefins used as carriers will usually have a viscosity (measured at 100° C.) in the range of 2 to 20 centistokes (cSt). Preferably, the poly-α-olefin has a viscosity of at least 8 cSt, and most preferably about 10 cSt at 100° C.

The poly(oxyalkylene) compounds which are among the preferred carrier fluids for use in this invention are fuel-soluble compounds which can be represented by the following formula

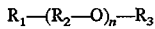

wherein $R_1$ is typically a hydrogen, alkoxy, cycloalkoxy, hydroxy, amino, hydrocarbyl (e.g., alkyl, cycloalkyl, aryl, alkylaryl, aralkyl, etc.), amino-substituted hydrocarbyl, or hydroxy-substituted hydrocarbyl group, $R_2$ is an alkylene group having 2–10 carbon atoms (preferably 2–4 carbon atoms), $R_3$ is typically a hydrogen, alkoxy, cycloalkoxy, hydroxy, amino, hydrocarbyl (e.g., alkyl, cycloalkyl, aryl, alkylaryl, aralkyl, etc.), amino-substituted hydrocarbyl, or hydroxy-substituted hydrocarbyl group, and n is an integer from 1 to 500 and preferably in the range of from 3 to 120 representing the number (usually an average number) of repeating alkyleneoxy groups. In compounds having multiple —$R_2$—O— groups, $R_2$ can be the same or different alkylene group and where different, can be arranged randomly or in blocks. Preferred poly(oxyalkylene) compounds are monools comprised of repeating units formed by reacting an alcohol with one or more alkylene oxides, preferably one alkylene oxide.

The average molecular weight of the poly(oxyalkylene) compounds used as carrier fluids is preferably in the range of from about 500 to about 3000, more preferably from about 750 to about 2500, and most preferably from above about 1000 to about 2000.

One useful sub-group of poly(oxyalkylene) compounds is comprised of the hydrocarbyl-terminated poly(oxyalkylene) monools such as are referred to in the passage at column 6, line 20 to column 7 line 14 of U.S. Pat. No. 4,877,416 and references cited in that passage, said passage and said references being incorporated herein by reference as if fully set forth.

A preferred sub-group of poly(oxyalkylene) compounds is comprised of one or a mixture of alkylpoly(oxyalkylene) monools which in its undiluted state is a gasoline-soluble liquid having a viscosity of at least about 70 centistokes (cSt) at 40° C. and at least about 13 cSt at 100° C. Of these compounds, monools formed by propoxylation of one or a mixture of alkanols having at least about 8 carbon atoms, and more preferably in the range of about 10 to about 18 carbon atoms, are particularly preferred.

The poly(oxyalkylene) carriers used in the practice of this invention preferably have viscosities in their undiluted state of at least about 60 cSt at 40° C. (more preferably at least about 70 cSt at 40° C.) and at least about 11 cSt at 100° C. (more preferably at least about 13 cSt at 100° C.). In addition, the poly(oxyalkylene) compounds used in the practice of this invention preferably have viscosities in their undiluted state of no more than about 400 cSt at 40° C. and no more than about 50 cSt at 100° C. More preferably, their viscosities will not exceed about 300 cSt at 40° C. and will not exceed about 40 cSt at 100° C. The most preferred poly(oxyalkylene) compounds will have viscosities of no more than about 200 cSt at 40° C., and no more than about 30 cSt at 100° C.

Preferred poly(oxyalkylene) compounds are poly(oxyalkylene) glycol compounds and monoether derivatives thereof that satisfy the above viscosity requirements and that are comprised of repeating units formed by reacting an alcohol or polyalcohol with an alkylene oxide, such as propylene oxide and/or butylene oxide with or without use of ethylene oxide, and especially products in which at least 80 mole % of the oxyalkylene groups in the molecule are derived from 1,2-propylene oxide. Details concerning preparation of such poly(oxyalkylene) compounds are referred to, for example, in Kirk-Othmer, *Encyclopedia of Chemical Technology*, Third Edition, Volume 18, pages 633–645 (Copyright 1982 by John Wiley & Sons), and in references cited therein, the foregoing excerpt of the Kirk-Othmer encyclopedia and the references cited therein being incorporated herein in toto by reference. U.S. Pat. Nos. 2,425,755; 2,425,845; 2,448,664; and 2,457,139 also describe such procedures, and are also incorporated herein by reference as if fully set forth herein.

A particularly preferred sub-group of poly(oxyalkylene) compounds is comprised of one or a mixture of alkylpoly (oxyalkylene)monools which in its undiluted state is a gasoline-soluble liquid having a viscosity of at least about 70 centistokes (cSt) at 40° C. and at least about 13 cSt at 100° C. Typically the maximum viscosities at these temperatures are no more than about 400 cSt at 40° C. and no more than about 50 cSt at 100° C. More preferably, their viscosities will not exceed about 300 cSt at 40° C. and will not exceed about 40 cSt at 100° C. The most preferred poly(oxyalkylene) compounds will have viscosities of no more than about 200 cSt at 40° C., and no more than about 30 cSt at 100° C. Of these compounds, monools formed by propoxylation of one or a mixture of alkanols having at least about 8 carbon atoms, and more preferably in the range of about 10 to about 18 carbon atoms, are particularly preferred.

The poly(oxyalkylene) compounds used pursuant to this invention will contain a sufficient number of branched oxyalkylene units (e.g., methyldimethyleneoxy units and/or ethyldimethyleneoxy units) to render the poly(oxyalkylene) compound gasoline soluble.

Another group of preferred carriers is the liquid polyalkylenes such as polypropenes, polybutenes, polyisobutenes, polyamylenes, copolymers of propene and butene, copolymers of butene and isobutene, copolymers of propene and isobutene, copolymers of propene, butene and isobutene, and the like. Use of materials of this general type together with other carrier fluids is described for example, in U.S. Pat. Nos. 5,089,028 and 5,114,435, the disclosures of which are incorporated herein by reference.

In some cases, the Mannich base detergent/dispersant can be synthesized in the carrier fluid. In other instances, the preformed detergent/dispersant is blended with a suitable amount of the carrier fluid. If desired, the detergent/dispersant can be formed in a suitable solvent or carrier fluid and then blended with an additional quantity of the same or a different carrier fluid.

Additive Proportions

The proportion of the liquid carrier used relative to the Mannich base in the preferred additive packages and fuel compositions of this invention is such that the fuel composition when consumed in an engine results in improved intake valve cleanliness as compared intake valve cleanliness of the same engine operated on the same composition except for being devoid of the liquid carrier. Thus in general, the weight ratio of carrier fluid to Mannich base detergent/dispersant on an active ingredient basis, i.e. excluding solvent(s), if any, used in the manufacture of the Mannich base either during or after its formation but before addition of the carrier fluid, will usually fall within the range of about 0.3:1 to about 2.0:1, and preferably within the range of about 0.6:1 to about 1.5:1.

Typically the additive concentrates of this invention contain from about 12 to about 69 wt. %, and preferably from about 22 to about 50 wt. % of the Mannich base detergent/dispersant on an active ingredient basis (see the immediately preceding paragraph for a definition of this term). The additive concentrates also contain carrier fluid, the level of which is determined by the desired carrier to Mannich base detergent/dispersant ratio. If desired, the additive concentrates may contain small amounts (e.g., a total of up to about 10 wt. % and preferably a total of up to about 5 wt. % based on the total weight of the additive concentrate), of one or more fuel-soluble antioxidants, demulsifying agents, rust or corrosion inhibitors, metal deactivators, combustion modifiers, alcohol cosolvents, octane improvers, emission reducers, friction modifiers, lubricity additives, ancillary detergent/dispersant additives, marker dyes, and the like. Multifunctional additives such as cyclopentadienyl manganese tricarbonyl compounds (e.g., methylcyclopentadienyl manganese tricarbonyl) can also be included in the additive concentrates.

When formulating the fuel compositions of this invention, the Mannich product and carrier fluid (with or without other additives) are employed in amounts sufficient to reduce or inhibit deposit formation in an internal combustion engine. Thus the fuels will contain minor amounts of the Mannich base detergent/dispersant and of the liquid carrier fluid proportioned as above that control or reduce formation of engine deposits, especially intake system deposits, and most especially intake valve deposits in spark-ignition internal combustion engines. Generally speaking the fuels of this invention will contain on an active ingredient basis as defined above, an amount of the Mannich base detergent/dispersant in the range of about 5 to about 150 ptb (pounds by weight of additive per thousand barrels by volume of fuel), and preferably in the range of about 10 to about 100 ptb. In the preferred fuel compositions wherein a liquid carrier fluid is used, the amount of the liquid carrier fluid will usually fall in the range of about 5 ptb to about 225 ptb, and preferably will be in the range of about 10 ptb to about 150 ptb. Other additives, such as one or more fuel-soluble antioxidants, demulsifying agents, rust or corrosion inhibitors, metal deactivators, combustion modifiers, alcohol cosolvents, octane improvers, emission reducers, friction modifiers, lubricity additives, ancillary detergent/dispersant additives, marker dyes, and multifunctional additives (e.g., methylcyclopentadienyl manganese tricarbonyl and/or other cyclopentadienyl manganese tricarbonyl compounds) can also be included in the fuels of this invention. These manganese compounds are among particularly preferred additional additives in the compositions of this invention because of their outstanding ability to reduce tailpipe emissions such as NOx and smog forming precursors, and to significantly improve the octane quality of fuel compositions, such as gasolines of the traditional types and of the newer "reformulated" types. Whatever components are selected for use in the compositions of this invention, each component should be present in an amount at least sufficient for it to exert its intended function or functions in the finished fuel composition.

The base fuels used in formulating the fuels of this invention are any and all base fuels suitable for use in the operation of spark ignition internal combustion engines such as unleaded motor and aviation gasolines, and so-called reformulated gasolines which typically contain both hydrocarbons of the gasoline boiling range and fuel-soluble oxygenated blending components such as alcohols, ethers, and other suitable oxygen-containing organic compounds. Preferred blending agents include fuel-soluble alkanols such as methanol, ethanol, and their higher homologs, and fuel-soluble ethers such as methyl tertiary butyl ether, ethyl tertiary butyl ether, methyl tertiary amyl ether, and analogous compounds, and mixtures of such materials. Oxygenales, when used, will normally be present in the base fuel in an amount below about 25% by volume, and preferably in an amount that provides an oxygen content in the overall fuel in the range of about 0.5 to about 5 percent by volume. However in the practice of this invention departures from these ranges of proportions are permissible whenever deemed necessary, appropriate or desirable.

The additives used in formulating the preferred fuels of this invention can be blended into the base fuel individually or in various sub-combinations. However, it is definitely preferable to blend all of the components concurrently using an additive concentrate of this invention as this takes advantage of the mutual compatibility afforded by the combination of ingredients when in the form of an additive concentrate. Also use of a concentrate reduces blending time and lessens the possibility of blending errors.

EXAMPLES

The practice and advantages of this invention are demonstrated by the following examples which are presented for purposes of illustration and not limitation. In each Mannich condensation reaction the following general procedure was used. The Mannich reaction products were derived by reaction among long chain alkylated phenol ("PBP"), N,N-dimethyl-1,3-propanediamine ("DMPD"), and formaldehyde ("FA") according to the mole ratios shown in Table 1. The PBP was formed by reacting phenol with polybutylenes having a number average molecular weight in the range of about 900 and a polydispersity in the range of about 1 to about 1.5. The PBP and DMPD were added to a resin kettle equipped with mechanized stirring, nitrogen feed, a Dean-Stark trap, and a heating mantle. Solvent, either heptane or Aromatic 100 at 25% by weight of product, was introduced and the mixture was heated to 50° C. along with a slight exotherm. Next, 37% formaldehyde solution was added gradually, while vigorous stirring was maintained. A second, mild exotherm was noted. The reaction mixture was heated to reflux; about 85° C. for heptane and 102° C. for Aromatic 100 solvent. The azeotropic blend of water and solvent was removed continuously over a period lasting one hour. The temperature was increased as required to sustain removal of water, then the reaction mixture was heated gradually to 150° C., while sparging with nitrogen. Under these conditions all of the heptane was stripped from the product in about one hour. The reaction employing Aromatic 100 solvent required one to three hours, and the majority of solvent remained in the reactor. After reaction the viscous product mixture was weighed and diluted with Aromatic 100 solvent as desired, or in the case of heptane the product was used neat or diluted into solvent.

The activity of the product mixtures, whether neat or in solvents, was determined by chromatographic separation. A 2-gram sample is separated on a silica gel column (40g of 60–200 mesh). The inactive components and alkylphenols are eluted from the column with n-hexane (400mL) and methylene chloride (400mL) respectively. The active Mannich components adhere to the gel, and can only be quantified by difference after all of the eluants are evaporated to dryness. The percentage of converted polyalkylphenol is calculated directly from the activity of the starting material and the weight fraction of polyalkylphenol in the product. Conversions for each example are given in Table 1.

Examples 1–18

Using the above generalized procedure various Mannich products of this invention were prepared from PBP, DMPD and FA in various mole ratios. In this group of runs the Mannich condensation reactions were performed in heptane as reaction solvent. In most cases samples of the products were subjected to analyses. Table 1 summarizes the relevant information and data. In those cases where a result is not available because the analysis was not conducted on the particular product, the designation "n/a" is used in the table.

TABLE 1

| Ex. No. | PBP Activity | Mole Ratio | % Unreacted PIB | % Unreacted PBP | % PBP Conversion | % N | TBN | Mn | Mw |
|---|---|---|---|---|---|---|---|---|---|
| 1 | 75.34 | 1/1/1.05 | 22.59 | 8.98 | 86.99 | n/a | n/a | 870 | 1352 |
| 2 | 74.00 | 1/0.89/0.93 | 21.22 | 15.56 | 74.24 | 1.76 | 64.50 | n/a | n/a |
| 3 | 74.00 | 1/1.11/0.93 | 21.23 | 15.12 | 74.98 | 1.89 | 68.40 | n/a | n/a |
| 4 | 74.00 | 1/1.11/1.17 | 20.81 | 7.76 | 86.90 | 1.99 | 69.50 | n/a | n/a |
| 5 | 76.38 | 1/1.18/1.24 | 20.56 | 3.83 | 94.24 | n/a | n/a | 1024 | 1519 |
| 6 | 78.75 | 1/0.94/0.99 | 20.19 | 10.76 | 85.62 | 1.78 | 62.10 | 908 | 1562 |
| 7 | 78.75 | 1/0.94/1.11 | 19.96 | 6.14 | 91.70 | 1.94 | 72.40 | n/a | n/a |
| 8 | 78.16 | 1/0.89/0.93 | 19.17 | 16.3 | 76.24 | n/a | n/a | 801 | 1294 |
| 9 | 78.16 | 1/1.11/0.93 | 20.26 | 16.94 | 76.64 | n/a | n/a | 847 | 1361 |
| 10 | 78.16 | 1/1.11/1.7 | 20.12 | 8.13 | 88.71 | n/a | n/a | 873 | 1386 |
| 11 | 74.50 | 1/1/1.05 | 21.74 | 5.23 | 91.77 | 1.75 | 65.40 | 973 | 1477 |
| 12 | 77.20 | 1/1/1.05 | 20.73 | 9.40 | 86.61 | 1.96 | 74.30 | 963 | 1461 |
| 13 | 77.76 | 1/1/1.05 | 19.11 | 8.15 | 87.80 | n/a | n/a | 904 | 1470 |
| 14 | 78.29 | 1/1/1.05 | 20.57 | 8.27 | 88.85 | n/a | n/a | 810 | 1310 |
| 15 | 78.29 | 1/1/1.05 | 20.56 | 9.21 | 87.58 | 1.95 | 73.10 | 889 | 1464 |
| 16 | 76.99 | 1/1/1.05 | 21.56 | 8.60 | 88.08 | n/a | n/a | 754 | 1222 |
| 17 | 77.81 | 1/1/1.05 | 19.95 | 10.19 | 85.43 | 1.83 | 68.30 | n/a | n/a |
| 18 | 79.30 | 1/1/1.05 | 17.88 | 7.41 | 89.18 | 2.01 | 75.05 | n/a | n/a |

Examples 19–29

Another group of Mannich products of this invention were prepared from PBP, DMPD and FA in using the above generalized procedure. In this group of runs the Mannich condensation reactions were performed in Aromatic 100 solvent at different reaction temperatures, except for Example 23 where the reaction was performed in heptane and then diluted with Aromatic 100 solvent, and Example 24 where three batches of Mannich condensation product were made in heptane and then diluted with Aromatic 100 solvent. In Example 25 the reaction was performed with the addition of 70 ppm of silicone antifoam (Dow Corning Fluid 200) to the reaction mixture. The mole ratios of PBP, DMPD and FA, respectively, were 1/1/1.05 except in Example 28 where a 1/1/1 ratio was used. In most cases samples of the products were subjected to analyses. Table 2 summarizes the relevant information and data. In Table 2, the % nitrogen and TBN values for Examples 19–22 are corrected for solvent loss during the reaction, and in Examples 23–29 the % nitrogen and TBN values are corrected for solvent loss during filtration. Again, in those cases where a result is not available because the analysis was not conducted, the designation "n/a" is used.

TABLE 2

| Ex. No. | PBP Activity | Temp., °C. | % Unreacted PIB | % Unreacted PBP | % PBP Conversion | % N | TBN | Mn | Mw |
|---|---|---|---|---|---|---|---|---|---|
| 19 | 77.8 | 150 | 15.88 | 8.53 | 84.67 | 1.88 | 64.70 | n/a | n/a |
| 20 | 77.8 | 150 | 16.28 | 8.97 | 84.28 | 1.77 | 64.77 | n/a | n/a |
| 21 | 77.8 | 165 | 16.53 | 9.88 | 82.94 | 1.79 | 64.85 | 801 | 1332 |
| 22 | 77.8 | 180 | 16.98 | 10.30 | 82.69 | 1.66 | 59.95 | 791 | 1274 |
| 23 | 79.30 | 150 | 11.51 | 5.62 | 87.25 | 1.30 | 47.2 | 754 | 1222 |
| 24 | n/a | 150 | 15.33 | 6.59 | n/a | 1.42 | 55.19 | n/a | n/a |
| 25 | 75.30 | 150 | 17.23 | 6.65 | 87.34 | 1.52 | 59.61 | 795 | 1287 |
| 26 | 79.80 | 165 | 13.70 | 6.21 | 88.53 | 1.46 | 55.62 | 821 | 1416 |
| 27 | 76.36 | 165 | 16.59 | 6.23 | 88.37 | 1.60 | 57.37 | n/a | n/a |
| 28 | 77.20 | 165 | 16.37 | 8.33 | 84.97 | 1.50 | 54.62 | n/a | n/a |
| 29 | 78.08 | 150 | 14.22 | 6.42 | 87.33 | 1.75 | 61.5 | n/a | n/a |

The finished Mannich condensation products of Examples 23–28 had the physical properties given in Table 3.

TABLE 3

| Ex. No. | Specific Gravity | Viscosity @40° C., cSt | Viscosity @100° C., cSt | Water ppm | Flash Point, °C. |
|---|---|---|---|---|---|
| 23 | 0.9075 | 94.78 | 12.97 | 469.00 | 54 |
| 24 | 0.9128 | 387.70 | 30.51 | 418.00 | 58 |
| 25 | 0.9113 | 338.00 | 27.86 | 614.00 | 44 |
| 26 | 0.9115 | 307.00 | 29.22 | 557.00 | 42 |
| 27 | n/a | 243.00 | 23.04 | 122.00 | 42 |
| 28 | n/a | 275.00 | 24.90 | 125.00 | 42 |

Examples 30–36

Gasoline fuel compositions of this invention, formulated using additive concentrates of this invention, were subjected to engine tests whereby the substantial effectiveness of these compositions in minimizing intake valve deposit weight was conclusively demonstrated. In one such test series the tests were performed using a Dodge 3.3-liter Intrepid on a mileage accumulation dynamometer. Each test involved operation for 5000 miles. The Mannich base detergents used in these tests were formed using the general procedure described above at a mole ratio of PBP, DMPD and FA, respectively, of 1/1/1.05, and the detergents were blended with poly(oxyalkylene) monool carriers in various proportions to form the additive concentrates which were then blended with separate quantities of the same commercially-available unleaded gasoline. The relevant information and results are summarized in Table 4, wherein Carrier A is a poly(oxypropylene) monool having an average molecular weight of about 1700, and a viscosity of about 96 cSt at 40° C. and about 17 cSt at 100° C.; Carrier B is a poly(oxypropylene) monool having an average molecular weight of about 1536, and a viscosity of about 102.5 cSt at 40° C. and about 17.91 cSt at 100° C.; Carrier C is a poly(oxypropylene) monool having an average molecular weight of about 1155, and a viscosity of about 65.46 cSt at 40° C. and about 11.52 cSt at 100° C. The ratios given in Table 4 are weight ratios of the carrier to the Mannich base (active content basis, i.e., excluding the weight of solvent).

TABLE 4

| Ex. No. | Carrier | Mannich, ptb | Carrier, ptb | Ratio | IVD, mg |
|---|---|---|---|---|---|
| 30 | A | 35.6 | 35 | 1.0 | 70.2 |
| 31 | B | 35 | 28 | 0.8 | 18.4 |
| 32 | B | 35 | 28 | 0.8 | 17.8 |
| 33 | B | 36 | 24 | 0.7 | 17.7 |
| 34 | C | 35 | 24.5 | 0.7 | 9.8 |
| 35 | B | 35 | 17.5 | 0.5 | 38.1 |
| 36 | B | 35 | 28 | 0.8 | 65.7 |
| Control | None | None | None | None | 490.3 |

Examples 37–38

The procedure of Examples 30–36 was used except that the vehicle used was a 1993 Oldsmobile Achieva equipped with a Quad4 engine operated on a mileage accumulation dynanometer for 5000 miles, and only Carrier A was used. Table 5 summarizes the information and results.

TABLE 5

| Ex. No. | Carrier | Mannich, ptb | Carrier, ptb | Ratio | IVD, mg |
|---|---|---|---|---|---|
| 37 | A | 41 | 41 | 1.0 | 31.6 |
| 38 | A | 41.7 | 32.8 | 0.8 | 17.6 |

Examples 39–41

The procedure of Examples 30–36 was again used except that in this series of tests the Standard BMW road test procedure was utilized wherein the vehicle was operated under the specified operating conditions on the road for 5000 miles. The relevant details and results are given in Table 6.

TABLE 6

| Ex. No. | Carrier | Mannich, ptb | Carrier, ptb | Ratio | IVD, mg |
|---|---|---|---|---|---|
| 39 | A | 41 | 40 | 1.0 | 2.7 |
| 40 | A | 32 | 32 | 1.0 | 34.8 |
| 41 | B | 32 | 22.4 | 0.7 | 15.2 |

Examples 42–46

Table 7 summarizes the results of a series of standard engine tests in which the intake valve deposit control effectiveness of compositions of this invention was compared against compositions not of this invention (Comparative Examples A–D). The engine tests were performed in Ford 2.3-liter engines operated either on a test stand or on a mileage accumulation dynamometer under standard operating conditions for determination of deposit formation on intake valves. In Table 7 are shown the number of moles of the amine and the number of moles of formaldehyde (FA) per mole of the PBP (alkylated phenol) used in making each of the Mannich product compositions used in this series of tests. In all of the Examples except Example D, the amine used in forming the Marreich detergent was N,N-dimethyl-1,3-propanediamine. The amine used in making the detergent of Example D was an ethylene polyamine, namely diethylene triamine. The carrier fluid was Carrier B above, and in each test fuel the weight ratio of carrier fluid to Mannich base detergent (active ingredient basis) was 1.0. Table 7 sets forth the intake valve deposit effectiveness (normalized to 100) as compared to intake valve deposit effectiveness in the same engines of corresponding fuel compositions in which the Mannich base dispersant was a commercially-available Mannich base detergent fuel additive made from polypropylphenol, diethylene triamine, and formaldehyde in accordance with U.S. Pat. No. 4,231,759 to Udelhofen et al., and which was heretofore deemed to be the most effective Marreich base detergent composition for fuels available in the marketplace. The tests were run in the same base gasoline and the amounts of the Mannich base detergents and carrier fluid used in each of the test fuels of Table 7 were equivalent on an active ingredient basis. The right hand column of the table gives percentage of improvement or, when negative, the percentage of loss of effectiveness, as compared to the commercial Mannich detergent additive.

TABLE 7

| Ex. No. | Moles Amine | Moles FA | Normalized IVD | Improvement |
| --- | --- | --- | --- | --- |
| 42 | 1.00 | 1.05 | 28* | 72% |
| 43 | 0.89 | 0.93 | 74 | 26% |
| 44 | 1.11 | 0.93 | 39 | 61% |
| 45 | 1.11 | 1.17 | 35 | 65% |
| 46 | 1.18 | 1.24 | 90* | 10% |
| A | 0.89 | 1.17 | 116 | −16% |
| B | 1.00 | 2.00 | 217 | −117% |
| C | 2.00 | 2.10 | 601 | −501% |
| D | 1.07** | 1.15 | 127 | −27% |

*Average of duplicate tests.
**Mannich base detergent made from diethylene triamine Examples 47–49

Table 8 summarizes the results of a group of standard tests in which the effectiveness of compositions of this invention was compared against compositions not of this invention (Comparative Examples E–H) in preventing valve sticking. The test procedure gives either a pass or a fail rating. In all tests the carrier fluid was Carrier A above. The Mannich base of this invention (Examples 47–49) was formed using the above generalized procedure from PBP, DMPD and FA in a mole ratio of 1/1/1.05, respectively. Comparative Examples E and F used a commercially-available Mannich base detergent fuel additive made from polypropylphenol, diethylene triamine, and formaldehyde in accordance with U.S. Pat. No. 4,231,759 to Udelhofen et al. Comparative Examples G and H used a Mannich base detergent fuel additive made from PBP, diethylene triamine, and formaldehyde in a mole ratio of 1:1.12:1.35, respectively.

TABLE 8

| Example | Carrier:Mannich Ratio | Test Result |
| --- | --- | --- |
| 47 | 0.8 | Pass |
| 48 | 0.7 | Pass |
| 49 | 0.6 | Fail |
| Comparative E | 0.8 | Fail |
| Comparative F | 1.0 | Pass |
| Comparative G | 1.0 | Fail |
| Comparative H | 1.25 | Pass |

It will be noted from Table 8 that the compositions of Examples 47 and 48 gave passing results with weight ratios of carrier to Mannich base detergent of 0.8 and 0.7 whereas the commercial detergent failed at a 0.8 ratio and passed at a 1.0 ratio, and a comparative Mannich base made from the same alkylated phenol as the Mannich base detergent of this invention but with an ethylene diamine (diethylene triamine) failed at a 1.0 ratio but did pass at the higher carrier ratio of 1.25.

Example 50

The improved (decreased) color characteristics of the Mannich base detergents of this invention were demonstrated by use of ASTM D-1500-91, a standard test method for determination of ASTM color of petroleum products. In this procedure, a liquid sample is placed in a test container and compared with colored glass disks ranging from 0.5 to 8.0. The lower the reported value, the lower the color and thus the better the product from the standpoint of consumer acceptance. Using this procedure it was found that samples of Mannich base detergents of this invention made from PBP, DMPD and FA at various ratios within the scope of this invention gave results in the range of 0.5 to 3.0 without addition of any carrier fluid. The commercial Mannich base fuel detergents under the same conditions are essentially opaque, black materials which cannot even be rated in the ASTM test.

It is to be understood that the reactants and components referred to by chemical name anywhere in the specification or claims hereof, whether referred to in the singular or plural, are identified as they exist prior to coming into contact with another substance referred to by chemical name or chemical type (e.g., base fuel, solvent, etc.). It matters not what chemical changes, transformations and/or reactions, if any, take place in the resulting mixture or solution or reaction medium as such changes, transformations and/or reactions are the natural result of bringing the specified reactants and/or components together under the conditions called for pursuant to this disclosure. Thus the reactants and components are identified as ingredients to be brought together either in performing a desired chemical reaction (such as a Mannich condensation reaction) or in forming a desired composition (such as an additive concentrate or additized fuel blend). It will also be recognized that the additive components can be added or blended into or with the base fuels individually per se and/or as components used in forming preformed additive combinations and/or subcombinations. Likewise preformed additive concentrates in which higher proportions of the additive components are blended together usually with one or more diluents or solvents, so that subsequently the concentrate can be blended with a base fuel or base fuel in the course of forming the finished fuel composition. Accordingly, even though the claims hereinafter may refer to substances, components and/or ingredients in the present tense ("comprises", "is", etc.), the reference is to the substance, component or ingredient as it existed at the time just before it was first blended or mixed with one or more other substances, components and/or ingredients in accordance with the present disclosure. The fact that the substance, component or ingredient may have lost its original identity through a chemical reaction or transformation during the course of such blending or mixing operations is thus wholly immaterial for an accurate understanding and appreciation of this disclosure and the claims thereof.

As used herein the term "fuel-soluble" means that the substance under discussion should be sufficiently soluble at 20° C. in the base fuel selected for use to reach at least the minimum concentration required to enable the substance to serve its intended function. Preferably the substance will have a substantially greater solubility in the base fuel than this. However, the substance need not dissolve in the base fuel in all proportions.

Each and every patent or other publication referred to in any portion of this specification is incorporated in toto into this disclosure by reference for all purposes, as if fully set forth herein.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

We claim:

1. A Mannich product composition formed from (i) one mole part of at least one hydroxyaromatic compound having on the ring an aliphatic hydrocarbyl substituent derived from a polyolefin having a number average molecular weight in the range of about 500 to about 3000, (ii) from 0.8 to 1.5 mole part(s) of at least one aliphatic polyamine having one and only one primary or secondary amino group in the molecule, and (iii) from 0.8 to 1.3 mole part(s) of at least one aldehyde, with the proviso that the mole ratio of aldehyde to amine is 1.2 or less.

2. A composition in accordance with claim 1 wherein the composition is formed by heating a mixture of (i), (ii) and (iii) at a temperature above about 40° C. at which a Mannich condensation reaction takes place.

3. A composition in accordance with claim 1 wherein the hydroxyaromatic compound is one mole part of a predominately monoalkylated phenol in which the alkyl substituent is derived from polypropylene, polybutylene or a copolymer of propylene and butylene having a number average molecular weight in the range of about 500 to about 3000 and a polydispersity in the range of about 1 to about 4, wherein the polyamine is from 0.8 to 1.2 mole part(s) of one or more N,N-dialkyl-$\alpha$,$\omega$-alkylenediamines in which the alkylene group has at least 3 carbon atoms, and wherein the aldehyde is from 0.8 to 1.2 mole part(s) of formaldehyde, provided the mole ratio of formaldehyde to said diamine(s) is 1.2 or less.

4. A composition in accordance with claim 1 wherein the hydroxyaromatic compound is a predominately monoalkylated phenol in which the alkyl substituent is derived from polypropylene, polybutylene or a copolymer of propylene and butylene having a number average molecular weight in the range of about 500 to about 3000 and a polydispersity in the range of about 1 to about 4, wherein the polyamine is N,N-dimethyl-1,3-propanediamine, wherein the aldehyde is formaldehyde, and wherein the mole ratio of the predominately monoalkylated phenol to N,N-dimethyl-1,3-propanediamine to formaldehyde used in forming said product composition is 1:1-1.15:0.90-1.20, respectively, with the proviso that if the molar quantity of formaldehyde used is larger than the molar quantity of the amine used, the excess molar amount of the formaldehyde does not exceed about 0.1.

5. A composition in accordance with claim 4 wherein the alkyl substituent of the predominately monoalkylated phenol is derived from polybutylene.

6. A composition in accordance with claim 4 wherein said mole ratio is about 1 mole of the N,N-dimethyl-1,3-propanediamine and about 1.05 mole of formaldehyde per mole of the predominately monoalkylated phenol.

7. A composition in accordance with claim 6 wherein the alkyl substituent of the predominately monoalkylated phenol is derived from polybutylene.

8. A fuel additive composition which comprises:
a) a fuel-soluble Mannich detergent/dispersant formed from (i) one mole part of at least one hydroxyaromatic compound having on the ring an aliphatic hydrocarbyl substituent derived from a polyolefin having a number average molecular weight in the range of about 500 to about 3000, (ii) from 0.8 to 1.5 mole part(s) of at least one aliphatic polyamine having one and only one primary or secondary amino group in the molecule, and (iii) from 0.8 to 1.3 mole pan(s) of at least one aldehyde, with the proviso that the mole ratio of aldehyde to amine is 1.2 or less; and
b) at least one liquid carrier for said Mannich detergent/dispersant in proportions such that for each part by weight of Mannich detergent/dispersant on an active ingredient basis there is in the range of about 0.3 to about 2.0 parts by weight of liquid carrier therefor.

9. A composition in accordance with claim 8 wherein the Mannich detergent/dispersant is produced by heating a mixture formed from (i), (ii) and (iii), at a temperature above about 40° C. at which a Mannich condensation reaction takes place.

10. A composition in accordance with claim 9 wherein the liquid carrier is at least one fuel-soluble poly(oxyalkylene) compound.

11. A composition in accordance with claim 10 wherein the weight ratio of said at least one poly(oxyalkylene) compound to the Mannich detergent/dispersant on an active ingredient basis is 2.0:1.0 or less.

12. A composition in accordance with claim 10 wherein said poly(oxyalkylene) compound is at least one poly(oxypropylene) monool formed from 1,2-propylene oxide and one or more primary alcohols having at least 8 carbon atoms per molecule.

13. A composition in accordance with claim 12 wherein said at least one monool has a kinematic viscosity in its undiluted state of at least 70 cSt at 40° C. and at least about 13 cSt at 100° C.

14. A composition in accordance with claim 9 further comprising at least one inert hydrocarbon solvent that has a boiling point or boiling range below about 200° C.

15. A composition in accordance with claim 12 further comprising at least one inert hydrocarbon solvent that has a boiling point or boiling range below about 200° C.

16. A composition in accordance with claim 9 wherein the hydroxyaromatic compound is one mole part of a predominately monoalkylated phenol in which the alkyl substituent is derived from polypropylene, polybutylene or a copolymer of propylene and butylene having a number average molecular weight in the range of about 500 to about 3000 and a polydispersity in the range of about 1 to about 4, wherein the polyamine is from 0.8 to 1.2 mole part(s) of one or more N,N-dialkyl-α,ω-alkylenediamines in which the alkylene group has at least 3 carbon atoms, and wherein the aldehyde is from 0.8 to 1.2 mole part(s) of formaldehyde, provided the mole ratio of formaldehyde to said diamine(s) is 1.2 or less.

17. A composition in accordance with claim 12 wherein the hydroxyaromatic compound is one mole part of a predominately monoalkylated phenol in which the alkyl substituent is derived from polypropylene, polybutylene or a copolymer of propylene and butylene having a number average molecular weight in the range of about 500 to about 3000 and a polydispersity in the range of about 1 to about 4, wherein the polyamine is from 0.8 to 1.2 mole part(s) of one or more N,N-dialkyl-α,ω-alkylenediamines in which the alkylene group has at least 3 carbon atoms, and wherein the aldehyde is from 0.8 to 1.2 mole part(s) of formaldehyde, provided the mole ratio of formaldehyde to said diamine(s) is 1.2 or less.

18. A composition in accordance with claim 9 wherein the hydroxyaromatic compound is a predominately monoalkylated phenol in which the alkyl substituent is derived from polypropylene, polybutylene or a copolymer of propylene and butylene having a number average molecular weight in the range of about 500 to about 3000 and a polydispersity in the range of about 1 to about 4, wherein the polyamine is N,N-dimethyl-1,3-propanediamine, wherein the aldehyde is formaldehyde, and wherein the mole ratio of the predominately monoalkylated phenol to N,N-dimethyl-1,3-propanediamine to formaldehyde used in forming said product composition is 1:1-1.15:0.90-1.20, respectively, with the proviso that if the molar quantity of formaldehyde used is larger than the molar quantity of the amine used, the excess molar amount of the formaldehyde does not exceed about 0.1.

19. A composition in accordance with claim 12 wherein the hydroxyaromatic compound is a predominately monoalkylated phenol in which the alkyl substituent is derived from polypropylene, polybutylene or a copolymer of propylene and butylene having a number average molecular weight in the range of about 500 to about 3000 and a polydispersity in the range of about 1 to about 4, wherein the polyamine is N,N-dimethyl-1,3-propanediamine, wherein the aldehyde is formaldehyde, and wherein the mole ratio of the predominately monoalkylated phenol to N,N-dimethyl-1,3-propanediamine to formaldehyde used in forming said product composition is 1:1-1.15:0.90-1.20, respectively, with the proviso that if the molar quantity of formaldehyde used is larger than the molar quantity of the amine used, the excess molar amount of the formaldehyde does not exceed about 0.1.

20. A composition in accordance with claim 19 wherein the alkyl substituent of the predominately monoalkylated phenol is derived from polybutylene.

21. A composition in accordance with claim 19 wherein said mole ratio is about 1 mole of the N,N-dimethyl-1,3-propanediamine and about 1.05 mole of formaldehyde per mole of the predominately monoalkylated phenol.

22. A composition in accordance with claim 21 wherein the alkyl substituent of the predominately monoalkylated phenol is derived from polybutylene.

23. A fuel composition for use in spark ignition internal combustion engines into which has been blended from about 5 to about 200 ptb of a composition of claim 1.

24. A fuel composition for use in spark ignition internal combustion engines into which has been blended:

a) a fuel-soluble Mannich detergent/dispersant formed from (i) one mole part of at least one hydroxyaromatic compound having on the ring an aliphatic hydrocarbyl substituent derived from a polyolefin having a number average molecular weight in the range of about 500 to about 3000, (ii) from 0.8 to 1.5 mole part(s) of at least one aliphatic polyamine having one and only one primary or secondary amino group in the molecule, and (iii) from 0.8 to 1.3 mole part(s) of at least one aldehyde, with the proviso that the mole ratio of aldehyde to amine is 1.2 or less; and b) at least one liquid carrier for said Mannich detergent/dispersant in proportions such that for each part by weight of Mannich detergent/dispersant on an active ingredient basis there is in the range of about 0.3 to about 2.0 parts by weight of liquid carrier therefor;

in an amount at least sufficient to reduce or minimize the weight of intake valve deposits in a spark ignition internal combustion engine operated on said fuel composition.

25. A composition in accordance with claim 24 wherein the liquid carrier is at least one fuel-soluble poly(oxyalkylene) compound.

26. A composition in accordance with claim 24 wherein the Mannich detergent/dispersant is produced by heating a mixture formed from (i), (ii) and (iii), at a temperature above about 40° C. at which a Mannich condensation reaction takes place.

27. A composition in accordance with claim 25 wherein said at least one poly(oxyalkylene) compound is at least one poly(oxypropylene) monool formed from 1,2-propylene oxide and one or more primary alcohols having at least 8 carbon atoms per molecule.

28. A composition in accordance with claim 27 wherein said at least one monool has a kinematic viscosity in its undiluted state of at least 70 cSt at 40° C. and at least about 13 cSt at 100° C.

29. A composition in accordance with claim 25 wherein the hydroxyaromatic compound is one mole part of a predominately monoalkylated phenol in which the alkyl substituent is derived from polypropylene, polybutylene or a copolymer of propylene and butylene having a number average molecular weight in the range of about 500 to about 3000 and a polydispersity in the range of about 1 to about 4, wherein the polyamine is from 0.8 to 1.2 mole part(s) of one or more N,N-dialkyl-α,ω-alkylenediamines in which the alkylene group has at least 3 carbon atoms, and wherein the aldehyde is from 0.8 to 1.2 mole part(s) of formaldehyde, provided the mole ratio of formaldehyde to said diamine(s) is 1.2 or less.

30. A composition in accordance with claim 27 wherein the hydroxyaromatic compound is one mole part of a predominately monoalkylated phenol in which the alkyl substituent is derived from polypropylene, polybutylene or a copolymer of propylene and butylene having a number average molecular weight in the range of about 500 to about 3000 and a polydispersity in the range of about 1 to about 4, wherein the polyamine is from 0.8 to 1.2 mole part(s) of one or more N,N-dialkyl-α,ω-alkylenediamines in which the alkylene group has at least 3 carbon atoms, and wherein the aldehyde is from 0.8 to 1.2 mole part(s) of formaldehyde, provided the mole ratio of formaldehyde to said diamine(s) is 1.2 or less.

31. A composition in accordance with claim 27 wherein the hydroxyaromatic compound is a predominately monoalkylated phenol in which the alkyl substituent is derived from polypropylene, polybutylene or a copolymer of propylene and butylene having a number average molecular weight in the range of about 500 to about 3000 and a polydispersity in the range of about 1 to about 4, wherein the polyamine is N,N-dimethyl-1,3-propanediamine, wherein the aldehyde is formaldehyde, and wherein the mole ratio of the predominately monoalkylated phenol to N,N-dimethyl-1,3-propanediamine to formaldehyde used in forming said product composition is 1:1-1.15:0.90-1.20, respectively, with the proviso that if the molar quantity of formaldehyde used is larger than the molar quantity of the amine used, the excess molar amount of the formaldehyde does not exceed about 0.1.

32. A composition in accordance with claim 28 wherein the hydroxyaromatic compound is a predominately monoalkylated phenol in which the alkyl substituent is derived from polypropylene, polybutylene or a copolymer of propylene and butylene having a number average molecular weight in the range of about 500 to about 3000 and a polydispersity in the range of about 1 to about 4, wherein the polyamine is N,N-dimethyl-1,3-propanediamine, wherein the aldehyde is formaldehyde, and wherein the mole ratio of the predominately monoalkylated phenol to N,N-dimethyl-1,3-propanediamine to formaldehyde used in forming said product composition is 1:1-1.15:0.90-1.20, respectively, with the proviso that if the molar quantity of formaldehyde used is larger than the molar quantity of the amine used, the excess molar amount of the formaldehyde does not exceed about 0.1.

33. A composition in accordance with claim 32 wherein said mole ratio is about 1 mole of the N,N-dimethyl-1,3-propanediamine and about 1.05 mole of formaldehyde per mole of the predominately monoalkylated phenol.

34. A method of minimizing or reducing intake valve deposits in a spark ignition internal combustion engine which comprises providing as fuel for the operation of the engine, a fuel composition in accordance with claim 25.

35. A method of minimizing or reducing intake valve deposits in a spark ignition internal combustion engine which comprises providing as fuel for the operation of the engine, a fuel composition in accordance with claim 28.

36. A method of minimizing or reducing intake valve deposits in a spark ignition internal combustion engine which comprises providing as fuel for the operation of the engine, a fuel composition in accordance with claim 33.

37. A method of minimizing or reducing intake valve sticking in a spark ignition internal combustion engine which comprises providing as fuel for the operation of the engine, a fuel composition in accordance with claim 25.

38. A method of minimizing or reducing intake valve sticking in a spark ignition internal combustion engine which comprises providing as fuel for the operation of the engine, a fuel composition in accordance with claim 28.

39. A method of minimizing or reducing intake valve sticking in a spark ignition internal combustion engine which comprises providing as fuel for the operation of the engine, a fuel composition in accordance with claim 33.

40. A Mannich product composition formed from (A) one mole part of at least one hydroxyaromatic compound having on the ring an aliphatic hydrocarbyl substituent derived from a polyolefin having a number average molecular weight in the range of about 500 to about 3000, (B) from 0.8 to 1.3 mole part(s) of at least one aldehyde, and (C) from 0.8 to 1.5 mole pan(s) of at least one aliphatic polyamine with the provisos that:

(1) the mole ratio of aldehyde to amine is 1.2 or less; and (2) the polyamine used in forming said composition has in the molecule one primary or secondary amino group capable of undergoing a Mannich condensation reaction with (A) and (B), the other amino group or groups in the molecule being substantially inert toward direct participation in such Mannich condensation reaction.

41. A composition in accordance with claim 40 wherein the composition is formed by heating a mixture of (A), (B) and (C) at a temperature above about 40° C. at which a Mannich condensation reaction takes place; wherein the hydroxyaromatic compound is one mole part of a predominately monoalkylated phenol in which the alkyl substituent is derived from polypropylene, polybutylene or a copolymer of propylene and butylene having a number average molecular weight in the range of about 500 to about 3000 and a polydispersity in the range of about 1 to about 4; wherein the polyamine is from 0.8 to 1.2 mole part(s) of one or more N,N-dialkyl-α,ω-alkylenediamines in which the alkylene group has at least 3 carbon atoms; and wherein the aldehyde is from 0.8 to 1.2 mole part(s) of formaldehyde, provided the mole ratio of formaldehyde to said aliamine(s) is 1.2 or less.

42. A composition in accordance with claim 40 wherein the composition is formed by heating a mixture of (A), (B) and (C) at a temperature above about 40° C. at which a Mannich condensation reaction takes place; wherein the hydroxyaromatic compound is a predominately monoalkylated phenol in which the alkyl substituent is derived from polypropylene, polybutylene or a copolymer of propylene and butylene having a number average molecular weight in the range of about 500 to about 3000 and a polydispersity in the range of about 1 to about 4; wherein the polyamine is N,N-dimethyl-1,3-propanediamine, wherein the aldehyde is formaldehyde; and wherein the mole ratio of the predominately monoalkylated phenol to N,N-dimethyl-1,3-propanediamine to formaldehyde used in forming said product composition is 1:1-1.15:0.90-1.20, respectively, with the proviso that if the molar quantity of formaldehyde used is larger than the molar quantity of the amine used, the excess molar amount of the formaldehyde does not exceed about 0.1.

43. A composition in accordance with claim 42 wherein said mole ratio is about 1 mole of the N,N-dimethyl-1,3-propanediamine and about 1.05 mole of formaldehyde per mole of the predominately monoalkylated phenol, and wherein the alkyl substituent of the predominately monoalkylated phenol is derived from polybutylene.

* * * * *